United States Patent Office 2,702,169
Patented Feb. 15, 1955

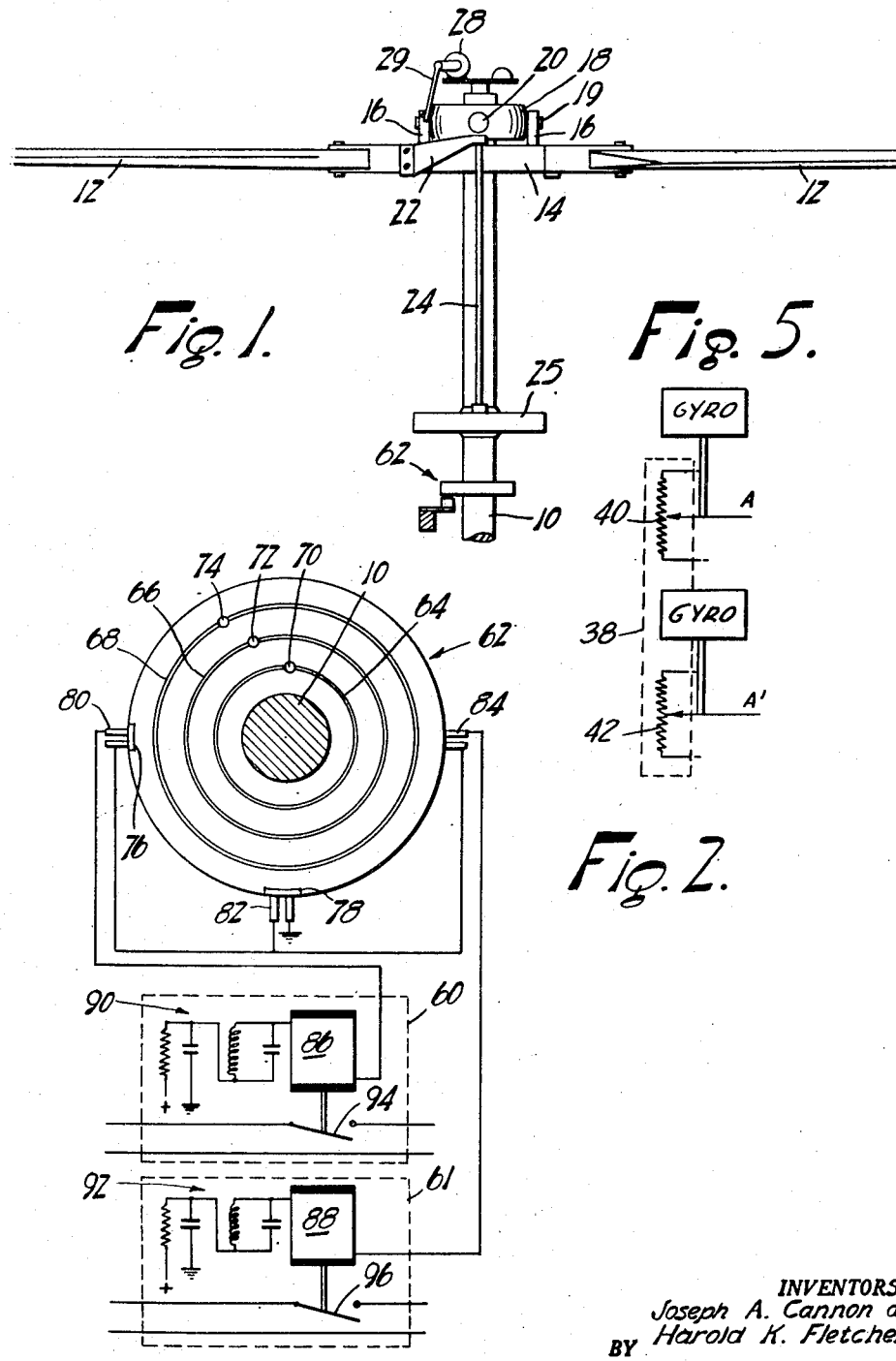

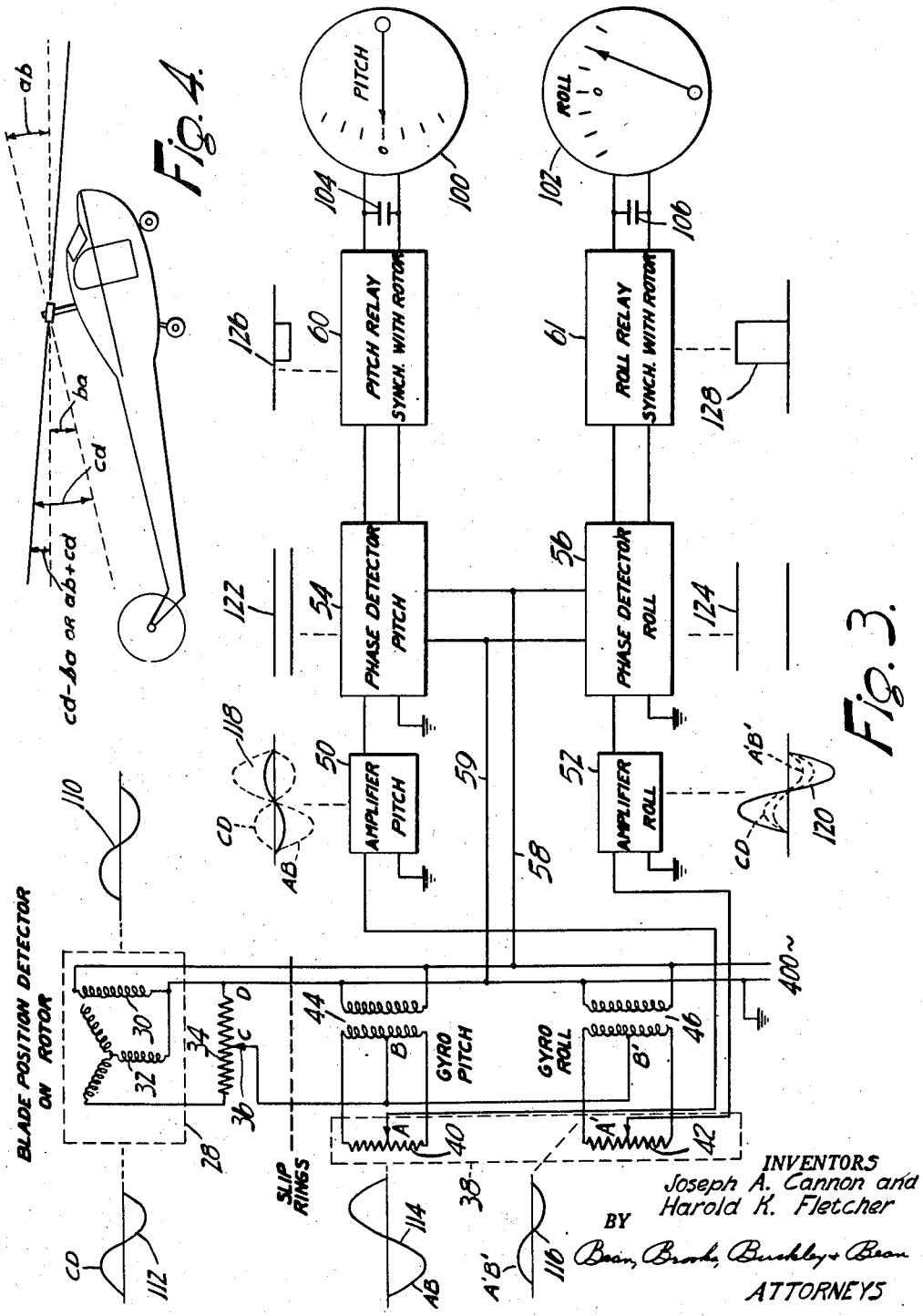

2,702,169

HELICOPTER ROTOR ATTITUDE INDICATING SYSTEM

Joseph A. Cannon, Lewiston, and Harold K. Fletcher, Buffalo, N. Y., assignors to Bell Aircraft Corporation, Wheatfield, N. Y.

Application June 8, 1950, Serial No. 166,798

8 Claims. (Cl. 244—17.11)

This invention relates to aircraft, and more particularly to instrument flight means in helicopter aircraft or the like.

An object of the invention is to provide in helicopter aircraft a practical instrument flight means whereby proper attitude control may be maintained under blind flying conditions.

Other objects and advantages of the invention will appear from the specification hereinafter.

Prior attempts at solution of the attitude or horizon problem in rotary wing aircraft employed the most obvious approach by attempting to use a fuselage-mounted standard gyro horizon indicator such as has proven highly successful in fixed wing aircraft. However, such devices indicate only the attitude of the aircraft fuselage relative to the horizon; and in the case of helicopter aircraft tests showed that fuselage attitude information, when hovering or flying at less than 40 miles per hour, was so misleading for the intended purposes as to be most unsatisfactory and dangerous. The fuselage-based gyro horizon proved satisfactory for flight at speeds above 40 miles per hour, under which conditions a helicopter type aircraft responds to control and flies in a manner somewhat similar to a fixed wing aircraft. However, such systems proved to be inadequate under low speed flight conditions, due to the lag in fuselage attitude change whenever the rotor is subjected to a disturbance.

Also, some consideration has been previously given to the swash plate indicator type device; but such arrangements in reality provided the pilot with information as to the cycling stick position relative to the fuselage, and therefore completely lacked the true horizon reference so necessary for accurate dynamic control of a helicopter type aircraft. In fact such arrangements were found to furnish information which was often of false value and therefore disastrously misleading.

The present invention contemplates utilization of a rotor tilt source of intelligence together with novel transmission and interpretation devices which will provide to the pilot accurate information at all times as to the rotor attitude. Whereas, a helicopter type aircraft comprises essentially a main lift rotor and a fuselage or body which suspends pendulously therebelow, flight control effects in such aircraft depend primarily upon the lift rotor disc attitude relative to the horizon and are substantially independent of swinging movements of the fuselage therebelow. More specifically, it is now well known that in any given machine a given rotor disc tilt angle will provide a given stabilized velocity condition. For example, for hovering at zero airspeed the rotor will be disposed essentially level with respect to the horizon, and for every given horizontal flight velocity there is a corresponding rotor disc tilt angle with respect to the horizon; and such functions are entirely independent of the center of gravity position, fuselage pitching moments, and the like. Thus, since any deviation of the rotor attitude relative to the horizon will result in a change of velocity, it is essential that the pilot be instantly furnished with information as to such deviation in order to anticipate the change and correct for it by suitable adjustment of his controls; and the present invention therefore contemplates a flight instrument system which provides the pilot with an anticipatory method of maintaining a desired condition of flight without being distracted by gust factors and the like such as would upset the operation of any conventional flight instrument.

More specifically, the invention contemplates the arrangement in a helicopter aircraft or the like of a first signal generator responsive to tilting of the rotor disc relative to the mounting fuselage, and a second signal generator responsive to tilting of the fuselage relative to the horizon; and means for comparing and interpreting the two signals so generated as to provide a resultant signal which is transmitted to a cockpit instrument for visually indicating to the pilot the attitude of the rotor disc relative to the horizon independently of the attitude of the fuselage. In accord with the usual representation of universal tilting movements by means of pitch and roll components, such resultant informations are furnished with respect to fore and aft tilting of the rotor disc as well as lateral tilting of the rotor disc.

In brief, a practical embodiment of one form which the invention may take is illustrated generally to include a Selsyn transmitter device arranged to provide an output voltage proportional to rotor tilt movements relative to the rotor mast. At the same time a standard horizon gyro is provided to supply output voltages proportional to longitudinal and lateral fuselage tilts relative to the horizon; and the outputs from these two sources are series added and then amplified. After being amplified the resultant output voltages are converted into corresponding direct current signals and then are fed into two sensitive center-reading D. C. volt meters through a synchronous relay mechanism which selects and separates the desired pitch and roll intelligence. These volt meters of course may be arranged with any desired dial arrangements so as to present to the pilot a suitable picturization of the attitude information.

In the drawing:

Fig. 1 is a fragmentary elevation of a helicopter lift rotor and control arrangement embodying the invention;

Fig. 2 is a diagram of a portion of the invention;

Fig. 3 is a diagram of the electrical system of the invention;

Fig. 4 is an illustration of one of the basic principles of the invention; and

Fig. 5 is a detail fragmentary view of the horizon gyroscope system of the invention.

Referring now more specifically to the drawing, the invention is illustrated in connection with a helicopter aircraft including a rotor mast 10 which of course is positionally integral with the fuselage, and a lift rotor mounted at the top of the mast 10 which is illustrated to comprise a pair of diametrically opposed blades 12—12 rooted upon a hub 14 but individually rotatable thereon for pitch change purposes. The hub 14 is in turn mounted for universal inclination relative to the mast 10 by means of paired stirrups 16—16 pivotally connected to a gimbal ring 18 by means of aligned pivot devices 19—19 having their pivot axes aligned longitudinally of the blades 12—12. In turn the ring 18 is pivotally mounted upon the mast 10 by means of diametrically opposed pivot devices 20 having their pivot axes aligned at right angles to the axes of the pivot devices 19—19; and thus as the shaft 10 rotates the rotor blades are driven to rotate therewith while at the same time the rotor blade tip path plane is universally inclinable relative to the mast. The rotor blades 12 are each provided with actuating horns 22 and push-pull rods 24 connected to a swash plate device 25 which is mounted for universal inclination on the mast 10 whereby the plate 25 may be controlled as desired to in turn produce cyclic pitch change effects in the blades 12—12 for controlling the plane of rotation of the rotor as is well known in the helicopter art.

Thus, it will be appreciated that the rotor system illustrated herein is mounted so that the rotor blade tip path plane is tiltable universally relative to the mast incidental to upsetting disturbances as by wind gusts, and also for purposes of maneuvering control of the aircraft. In the illustrated form of the apparatus, such tilting of the rotor relative to the mast or fuselage of the aircraft is measured by means of a signal generator 28 mounted on the mast 10 and connected to one of the rotor blades 12 to be driven thereby as that blade pivots upon the bearings 20—20 while describing a tilted rotor blade path. The requisite electrical signals may be derived from a suitable source such as a Selsyn or Autosyn generator, or a potentiometer, or a voltage generator; in any case the source being mechanically driven by the actual flapping motion of the rotor upon the pivots 20—20. Thus the signal generator 28 is mounted on the top of the mast 10 to be integral therewith and the rotor thereof is operatively connected by a crank and linkage 29 to one of the stirrups 16 to be mechanically actuated thereby as the corresponding rotor blade 12 pivots on the bearings 20—20 as previously described.

In the illustrated embodiment of the invention, a Selsyn generator is utilized to measure the motion of the rotor blade 12 as the latter deviates from its neutral position of substantial perpendicularity to the rotor mast. This Selsyn generator is shown diagrammatically in Fig. 3 to comprise a rotor or primary winding 30 and a stator or secondary winding 32 having three terminals and being arranged to provide changing outputs as the rotor of the Selsyn is turned, as is well known in the art. In this case, one of the terminals of the rotor winding 30 is connected to one of the terminals of the stator winding 32 and to ground through a slip ring on the mast 10, and only one of the other terminals of the stator winding 32 is used, this being connected through a potentiometer resistance 34 to ground so that an adjustable output signal CD may be obtained between the potentiometer slide 36 and the ground. As will be readily understood, when the rotor coil 30 is energized by a suitable alternating current potential, an output voltage will be secured at CD which is proportional in amplitude to the displacement of the Selsyn rotor from a neutral position and which varies in sense (that is, undergoes a 180° phase shift) according to the direction of displacement of the Selsyn rotor from that neutral position.

As stated more generally hereinabove, a standard type horizon gyroscope is mounted within the fuselage of the helicopter, and the signal output elements of such a gyro are illustrated diagrammatically at 38 to comprise pitch and roll potentiometers 40—42 which are externally energized by transformers 44 and 46 center tapped at B and B' and whose sliding contacts A—A' are driven by the pitch and roll movements of the gyro, respectively. Thus, it will be understood that movements of the slides A—A' from their center, neutral positions due to corresponding movements of the gyro from its neutral, horizontal position will result in unbalance of the circuits just described so that corresponding voltages will appear between terminals A—B and between terminals A'—B', and these voltages will vary in sense and amplitude according to the direction and amount of the respective displacement of the slides A—A'.

Signal CD is separately series added to signals AB and A'B' by connection of slide 36 to the center taps of the secondaries of transformers 44 and 46, point D being connected to ground as stated above. The polarities of the signals AB, A'B' and CD are relatively fixed by connecting the energizing 400 cycle per second voltage to the Selsyn and gyro circuits appropriately so that the series addition of the signals eliminates the position of the mast 10 from consideration, as shown in Figure 4. Terminals A and A' are connected to separate amplifiers 50—52, the other input terminals of which are grounded to complete the circuits to D. The outputs of the amplifiers 50—52 are then fed as input signals into a pair of phase detectors 54—56 where they are compared to a reference voltage supplied from lines 58—59 which are connected to the same 400 cycle per second supply which is used to excite primaries of the transformers 44 and 46 as well as the rotor winding 30. These phase detectors 54—56 are employed to determine the sense of their input signals, that is, whether those input signals are in phase with or 180° out of phase with the 400 cycle per second reference voltage of the lines 58—59 and also to convert the alternating current input signals to direct current outputs which correspond thereto in both sense and amplitude, and, of course, any suitable type of detector may be used.

The outputs of the phase detectors are supplied to a pair of relay circuits 60—61 which are more fully shown in Fig. 2 where they are shown in relation to a segmented slip ring synchronizing arrangement. As shown in the figure, the rotor mast 10 carries a slip ring device 62 which comprises three continuous slip rings 64, 66, 68, which cooperate with three brush devices 70, 72, 74 respectively, to transmit the voltages from the Selsyn generator to the relatively stationary fuselage as the generator rotates with the mast. The slip ring device 62 also carries a pair of 90° separated conducting segments 76—78 which cooperate with three 90° separated double brush devices 80, 82, and 84, to synchronize the energization of a pair of relay coils 86—88 to the rotation of the mast 10. The circuits of the relay coils 86—88 may include suitable time constant networks 90—92 for the purpose of providing a greater accuracy of timing than could be obtained from the slip ring and brush arrangement alone. The coils 86—88 are arranged to actuate a pair of contactors 94—96, respectively, which interconnect the outputs of the phase detectors with the input terminals of a pair of center reading direct current volt meters 100—102. Each meter 100—102 is connected in parallel with a condenser 104—106, which is charged by the direct current pulses delivered by the corresponding relay 94—96 so as to maintain a voltage at the meter which is substantially a smooth envelope of those pulses.

The operation of the illustrated embodiment of the invention will be explained in connection with a series of voltage-time diagrams which illustrate the form of signal present in the various parts of the circuit, but it is to be understood that no attempt has been made to relate these diagrams to the positions of the signal source elements as shown, the diagrams being arbitrary and for the purpose of illustrating the following discussion only. The common 400 cycle per second energizing potential is illustrated at 110, and as hereinbefore described, when the rotor blade 12 to which the Selsyn generator is coupled describes a tilted rotor path with respect to the mast 10, it swings above and below its neutral position so as to cause the Selsyn rotor 30 to correspondingly rotate in one direction and then in the other past its neutral or zero output position. A typical instantaneous value of CD is indicated at 112 to be a 400 cycle per second voltage of positive sense (that is, in phase with the 400 cycle per second source) and of medium amplitude in accord with a certain instantaneous position of the rotor blade 12 with respect to the mast 10. At the same time, typical values of AB and A'B' are indicated at 114 and 116, respectively, to be of negative sense and large amplitude and of positive sense and small amplitude, respectively, indicating a typical pitch and roll condition of the fuselage relative to the horizon. The series sum of AB plus CD is shown at 118, then, to be a signal of negative sense and small amplitude, while the series sum of A'B' plus CD is shown at 120 to be a signal of positive sense and large amplitude, the dotted lines in each case indicating the component signals AB, CD, and A'B'. The signals as illustrated at 118 and 120 are converted into their DC equivalents in sense and amplitude by the phase detectors 54—56, as indicated at 122 and 124, respectively. The voltage diagrams thus far are for an arbitrary instant of time; however, it will be understood that the relays 60 and 61 do not close simultaneously so that the diagrams of their output voltages 126—128 cannot both correspond to the instantaneous situation portrayed in the preceding diagrams, except in the special situation wherein the declination of the rotor with respect to the mast 10 is such that the signal CD is the same during the closure of each of the relays 60—61, assuming no change in the gyro during the short interval under consideration.

Since the inputs to the phase detectors are amplified sum signals containing in each case the corresponding gyro coordinate signal together with the continuously varying Selsyn signal, it is necessary to select only that portion of each said sum signal which contains the corresponding pitch or roll instantaneous Selsyn signal, and that is the function of the relay devices. Thus, the pitch relay 60 is arranged to close at a moment when the rotor blade 12 by which the Selsyn is driven is at its forward or longitudinal position, at which time the sum signal AB plus CD will contain only pitch components; and the roll relay device 61 is arranged to close when that rotor blade is at the port or lateral position, at which time the sum signal A'B' plus CD contains only roll components. Referring to Fig. 2, the foregoing result is accomplished by locating the conductive segments 76—78 in starboard and forward positions, respectively, when the rotor blade 12 which drives the Selsyn is in its forward position. The diagrams 126—128, then, indicate typical pulse signals which are formed by momentary closure of the corresponding relays and it will be readily understood that the charge across the condensers 104—106 will each be substantially an envelope of those pulses so as to give a steady indication at the corresponding pitch and roll meters 100—102.

It will be appreciated that an important feature of the invention resides in utilizing the attitude of the fuselage as an intermediate reference between the attitude of the rotor path or disc and the horizon as established by the fuselage-carried gyro. This is shown in Fig. 4 wherein the relationships involved are illustrated. Thus, the rotor 12 is shown revolving in a plane disposed at an angle $cd$ with respect to its normal position of perpendicularity to the mast 10, while the fuselage makes an opposite angle $ab$ with respect to the horizontal as established by a gyro carrier thereby. The actual tilt of the rotor disc is therefore the difference between $cd$ and $ba$; or in other words, the sum of $ab$ and $cd$. Thus, if the electrical signals AB, A'B', and CD are similarly compared as hereinabove described the rotor tilt with respect to the horizon will be indicated irrespective of the attitude of the helicopter fuselage.

While a specific choice and arrangement of elements has been illustrated wherein 400 cycle per second signals of varying sense and amplitude are generated, compared, and interpreted; it will be obvious that other arrangements and different elements could be substituted in carrying out the invention. For example, the output signal might be supplied to an autopilot device instead of to visual indicator meters, or the illustrated alternating current system might be supplanted with a direct current system or a phase-modulated system. Likewise, the signal generator at the rotor might be made responsive to velocity of displacement instead of to amplitude of displacement. Thus, the invention contemplates a flight instrument which employs any suitable means to reveal operating conditions of the rotor, and additionally provides for comparison of such information with the displacement of the fuselage with respect to the horizon or other reference so that the operating condition of the rotor with respect to the horizon or other reference may be indicated; and the invention is not limited to any specific means of measurement or comparison or ultimate use of that comparison.

We claim:

1. In a rotary wing aircraft comprising a lift rotor and a fuselage suspended pendulously therebelow by means of rotor mast means positionally integral with said fuselage and pivotally connected to said rotor, rotor signal generating means directly coupled to said rotor to be mechanically driven by tilting of the path of rotation of said rotor with respect to said mast means to generate a signal at all times corresponding exactly to the attitude of said rotor path relative to said mast means, gyroscope means establishing a reference plane substantially independent of movement of said fuselage, gyroscope signal generating means mechanically actuated by tilting of said fuselage with respect to said reference plane, and means for comparing the signals of said rotor and said gyroscope generating means to define the attitude of said rotor path with respect to said reference plane independently of movements of said fuselage.

2. In a rotary wing aircraft, a lift rotor comprising multiple individually pitch change adjustable blades, a fuselage pivotally suspended below said rotor, pitch change means for selective pitch adjustments of said blades, measurement means coupled to said rotor independently of said pitch change means and directly responsive to the attitude of said rotor with respect to said fuselage for defining the tilt of the path of rotation of said rotor relative to said fuselage, artificial horizon means responsive to the position of said fuselage relative to a predetermined reference plane for defining the tilt of said fuselage relative to said reference plane, and correlating means responsive to said measurement means and to said artificial horizon means for defining the tilt of said path of rotor rotation relative to said reference plane.

3. In a rotary wing aircraft, a lift rotor mechanism and a fuselage pivotally connected thereto, measurement means responsive to tilt conditions of said rotor mechanism relative to said fuselage, said measurement means having one part positionally fixed relative to said rotor mechanism and another part positionally fixed relative to said fuselage, direction establishing means responsive to the angular displacement of said fuselage relative to a reference direction, and correlating means responsive to said measurement means and to said direction establishing means for defining said tilt condition relative to said reference direction.

4. In a rotary wing aircraft comprising a lift rotor having multiple individually pitch change adjustable blades, a fuselage, rotor mast means positionally integral with said fuselage, rotor hub means universally adjustable on said mast means, whereby said fuselage is suspended pendulously below said lift rotor, and pitch change means for selectively adjusting the pitch of said blades, rotor signal generating means mechanically connected between said rotor and said mast means independently of said pitch change means between said rotor and said mast means to be driven at all times in direct accordance with the tilt of the path of rotation of said rotor with respect to said mast means, gyroscope means establishing a reference plane substantially independent of movement of said fuselage, gyroscope signal generating means mechanically actuated by said gyroscope means in accordance with the tilt of said fuselage with respect to said reference plane, and means for comparing the signals of said rotor and gyroscope signal generating means to define the tilt of said rotor path with respect to said reference plane independently of the position of said fuselage.

5. In a rotary wing aircraft, a lift rotor having multiple individually pitch change adjustable blades, a fuselage pivotally connected to said lift rotor, pitch change means for selectively adjusting the pitch of said blades, angular displacement detection means coupled to said rotor independently of said pitch change means for actuation only by tilting movements of said lift rotor relative to said fuselage, and receiver means within said fuselage responsive to said detection means.

6. In a rotary wing aircraft, a fuselage, a lift rotor mechanism pivotally connected to said fuselage, angular displacement detection means directly coupled to said rotor mechanism for actuation by associated movement of said rotor mechanism relative to said fuselage, said detection means having one part positionally fixed with respect to said rotor mechanism and another part positionally fixed relative to said fuselage, and receiver means within said fuselage responsive to said detection means.

7. In a rotory wind aircraft, a lift rotor having multiple individually pitch change adjustable blades, a fuselage, means pivotally connecting said rotor and said fuselage, pitch change means for selectively adjusting the pitch of said blades, first displacement detection means separate from said pitch change means and driven by tilting movements of said lift rotor relative to said fuselage, second displacement detection means within said fuselage and effectively responsive to displacement of said fuselage relative to an external reference, and intelligence transmission means interconnecting said first detection means and said second detection means.

8. In a rotary wing aircraft, a lift rotor mechanism, a fuselage, means pivotally connecting said rotor mechanism and said fuselage, first displacement detection means driven by tilt associated movements of said rotor mechanism relative to said fuselage, said first detection means having one part positionally fixed relative to said rotor mechanism and another part positionally fixed relative to said fuselage, second displacement detecting means effectively responsive to displacement of the fuselage relative to an external reference, and intelligence transmission means interconnecting said first detection means and said second detection means.

References Cited in the file of this patent

UNITED STATES PATENTS

| | | |
|---|---|---|
| 2,427,939 | Woods | Sept. 23, 1947 |
| 2,479,549 | Ayres et al. | Aug. 23, 1949 |
| 2,529,479 | Bates | Nov. 14, 1950 |
| 2,567,212 | Klopp et al. | Sept. 11, 1951 |

FOREIGN PATENTS

| | | |
|---|---|---|
| 601,999 | Great Britain | May 18, 1948 |